(12) United States Patent
Kim et al.

(10) Patent No.: US 12,541,810 B2
(45) Date of Patent: Feb. 3, 2026

(54) ELECTRONIC DEVICE AND OPERATING METHOD THEREOF

(71) Applicant: SAMSUNG ELECTRONICS CO., LTD., Suwon-si (KR)

(72) Inventors: Dohyun Kim, Suwon-si (KR); Joonyong Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 18/096,363

(22) Filed: Jan. 12, 2023

(65) Prior Publication Data

US 2023/0196499 A1 Jun. 22, 2023

Related U.S. Application Data

(63) Continuation of application No. PCT/KR2022/014497, filed on Sep. 27, 2022.

(30) Foreign Application Priority Data

Dec. 16, 2021 (KR) .................. 10-2021-0180350
May 3, 2022 (KR) .................. 10-2022-0054843

(51) Int. Cl.
*G06T 1/20* (2006.01)
*G06T 1/60* (2006.01)

(52) U.S. Cl.
CPC .............. *G06T 1/20* (2013.01); *G06T 1/60* (2013.01); *G06T 2200/24* (2013.01)

(58) Field of Classification Search
None
See application file for complete search history.

(56) References Cited

U.S. PATENT DOCUMENTS 7,095,416 B1 * 8/2006 Johns .................. A63F 13/45
712/205
8,006,232 B1 8/2011 Rideout et al.
(Continued)

FOREIGN PATENT DOCUMENTS

CN 102591657 B 6/2014
KR 10-1650999 B1 8/2016
(Continued)

OTHER PUBLICATIONS

Search Report (PCT/ISA/210) issued Jan. 2, 2023 by the International Searching Authority for International Patent Application No. PCT/KR2022/014497.
(Continued)

*Primary Examiner* — Ryan M Gray
(74) *Attorney, Agent, or Firm* — Sughrue Mion, PLLC

(57) ABSTRACT

Provided is an electronic device including a first processor configured to generate frames by performing render operation stages based on graphics data, a memory configured to store an application to obtain information corresponding to the first processor, a display, and a second processor electrically connected to the first processor, the memory, and the display, wherein the second processor is configured to execute the application, obtain render stage information corresponding to the frames through the executed application, extract first render stage information corresponding to a first frame, among the frames, from the obtained render stage information, process the extracted first render stage information, and control the display to display a user interface (UI) screen including the processed first render stage information.

20 Claims, 11 Drawing Sheets

(56) References Cited

U.S. PATENT DOCUMENTS

| | | | |
|---|---|---|---|
| 8,701,091 B1* | 4/2014 | Wloka | G06F 9/451 |
| | | | 717/125 |
| 8,810,590 B2 | 8/2014 | Oat et al. | |
| 8,963,932 B1 | 2/2015 | Kiel et al. | |
| 9,483,862 B2 | 11/2016 | Goel et al. | |
| 11,200,637 B2* | 12/2021 | Hu | G06F 9/451 |
| 2010/0211933 A1* | 8/2010 | Kiel | G06F 11/3636 |
| | | | 717/125 |
| 2012/0081378 A1 | 4/2012 | Roy et al. | |
| 2013/0275874 A1* | 10/2013 | Cerny | G06F 11/3612 |
| | | | 715/719 |
| 2015/0154051 A1* | 6/2015 | Kruglick | H04L 67/565 |
| | | | 345/522 |
| 2015/0178974 A1 | 6/2015 | Goel et al. | |
| 2020/0213654 A1* | 7/2020 | Unter Ecker | H04N 21/8146 |
| 2020/0250789 A1 | 8/2020 | Hu et al. | |
| 2020/0379815 A1* | 12/2020 | Banerjee | G06T 1/20 |
| 2020/0379864 A1* | 12/2020 | Haberstro | G06T 15/005 |
| 2021/0358192 A1 | 11/2021 | Zhang et al. | |

FOREIGN PATENT DOCUMENTS

| | | |
|---|---|---|
| KR | 10-2016-0109072 A | 9/2016 |
| KR | 10-2017-0031480 A | 3/2017 |
| KR | 10-2020-0057478 A | 5/2020 |
| KR | 10-2020-0118192 A | 10/2020 |
| KR | 10-2254679 B1 | 5/2021 |

OTHER PUBLICATIONS

Communication dated Dec. 2, 2024, issued by European Patent Center in European Patent Application No. 22907638.5.
Communication dated Nov. 18, 2025 issued by the Intellectual Property India in Indian Patent Application No. 202417035320.

* cited by examiner

ELECTRONIC DEVICE AND OPERATING METHOD THEREOF

CROSS-REFERENCE TO RELATED APPLICATIONS

This application is a continuation application of International Application No. PCT/KR2022/014497 designating the United States, filed on Sep. 27, 2022, at the Korean Intellectual Property Receiving Office and claims priority to Korean Patent Application No. 10-2021-0180350, filed on Dec. 16, 2021, and Korean Patent Application No. 10-2022-0054843, filed on May 3, 2022, at the Korean Intellectual Property Office, the disclosures of which are incorporated by reference herein in their entireties.

BACKGROUND

1. Field

Embodiments of the disclosure relate to an electronic device.

2. Description of Related Art

An electronic device (e.g., a mobile terminal) may include a graphics processing unit (GPU) for graphics processing.

Conventionally, an electronic device may need to be connected to a personal computer (PC) to identify render stage information of a GPU.

SUMMARY

A personal computer (PC) may display render stage information of a GPU of an electronic device. A user may drag or zoom in on/out of a portion of render stage information displayed on a display of a PC to identify desired information from the displayed render stage information. It may be necessary to provide render stage information of a GPU to a user without connecting an electronic device to a PC and to allow the user to more easily identify the render stage information of the GPU.

One or more embodiment may provide an electronic device that without being connected to a PC may provide render stage information of a GPU to a user.

One or more embodiment may provide an electronic device that may allow a user to more easily identify render stage information of a GPU on a small screen of the electronic device.

The technical goals to be achieved are not limited to those described above, and other technical goals not mentioned above are clearly understood by one of ordinary skill in the art from the following description.

According to an aspect of an embodiment, there is provided an electronic device including a first processor configured to generate frames by performing render operation stages, the generating of the frames being based on graphics data, a memory configured to store an application to obtain information corresponding to the first processor, a display, and a second processor electrically connected to the first processor, the memory, and the display, wherein the second processor is configured to execute the application, obtain render stage information corresponding to the frames through the executed application, extract first render stage information corresponding to a first frame, among the frames, from the obtained render stage information, process the extracted first render stage information, and control the display to display a user interface (UI) screen including the processed first render stage information.

The second processor may be configured to divide the obtained render stage information for each of the frames based on a queue submission time of a first graphics rendering library, and extract the first render stage information based on the dividing of the obtained render stage information.

The extracted first render stage information may include an operation time of each of render passes of the first frame, and the second processor may be further configured to sort the extracted first render stage information based on the operation time of each of the render passes.

The second processor may be further configured to control the display to display a bar graph corresponding to a proportion of an operation time of each of the render passes to perform an individual render operation stage to the operation time of each of the render passes.

The second processor may be further configured to divide the obtained render stage information for each of the frames based on a usage pattern of frame buffers, and extract the first render stage information based on the dividing of the obtained render stage information.

The extracted first render stage information may include an operation time of each of the frame buffers, and the second processor may be further configured to sort the extracted first render stage information based on the operation time of each of the frame buffers.

The second processor may be further configured to obtain render stage information of subsequent frames of the first frame based on detecting a user input on an update button on the UI screen, extract second render stage information of a second frame from the render stage information of the subsequent frames, process the extracted second render stage information, and change the processed first render stage information to the processed second render stage information on the UI screen.

The obtained render stage information may include render stage information corresponding to the executed application and render stage information corresponding to one or more of other executed applications, and the second processor may be further configured to identify a target application among the executed application and the one or more of the other executed applications, and extract render stage information corresponding to the identified target application from the obtained render stage information.

According to another aspect of an embodiment, there is provided an electronic device including a memory configured to store a first application and a second application, a first processor configured to generate frames by performing render operation stages, the generating of the frames being based on graphics data of the first application, a display, and a second processor electrically connected to the memory, the first processor, and the display, wherein the second processor is configured to execute the second application based on the first application being executed, obtain render stage information corresponding to the frames based on the executed second application, extract first render stage information of a first frame among the frames, from the obtained render stage information, process the extracted first render stage information, and control the display to display a user interface (UI) screen including the processed first render stage information.

The second processor may be further configured to divide the obtained render stage information for each of the frames based on a queue submission time of a first graphics rendering library, and extract the first render stage information based on the dividing of the obtained render stage information.

The extracted first render stage information may include an operation time of each of render passes of the first frame, and the second processor may be further configured to sort the extracted first render stage information based on the operation time of each of the render passes.

The second processor may be further configured to control the display to display a bar graph corresponding to a proportion of an operation time of each of the render passes to perform an individual render operation stage to the operation time of each of the render passes.

The second processor may be further configured to divide the obtained render stage information for each of the frames based on a usage pattern of frame buffers, and extract the first render stage information based on the dividing of the obtained render stage information.

The extracted first render stage information may include an operation time of each of the frame buffers, and the second processor may be further configured to sort the extracted first render stage information based on the operation time of each of the frame buffers.

The second processor may be further configured to obtain render stage information of subsequent frames of the first frame based on detecting a user input on an update button on the UI screen, extract second render stage information of a second frame from the render stage information of the subsequent frames, process the extracted second render stage information, and change the processed first render stage information to the processed second render stage information on the UI screen.

The obtained render stage information may include render stage information corresponding to the executed first application, render stage information corresponding to the executed second application, and render stage information corresponding to an executed third application, and the second processor may be further configured to extract render stage information corresponding to the first application from the obtained render stage information.

According to another aspect of an embodiment, there is provided an operating method of an electronic device, the operating method including executing an application to obtain information corresponding to a first processor configured to process graphics processing, obtaining render stage information corresponding to frames based on the performed graphics processing through the executed application, extracting first render stage information of a first frame, among the frames, from the obtained render stage information, processing the extracted first render stage information, and displaying a user interface (UI) screen including the processed first render stage information on a display.

The extracting of the first render stage information may include dividing the obtained render stage information for each of the frames based on a queue submission time of a first graphics rendering library, and extracting the first render stage information based on the dividing of the obtained render stage information.

The extracting of the first render stage information may include dividing the obtained render stage information for each of the frames based on a usage pattern of frame buffers, and extracting the first render stage information from based on the dividing of the obtained render stage information.

The operating method may further include obtaining render stage information of subsequent frames of the first frame based on the executed application, the obtaining the render stage information being based on based on detecting a user input on an update button on the UI screen, extracting second render stage information of a second frame from the render stage information of subsequent frames, processing the extracted second render stage information, and changing the processed first render stage information to the processed second render stage information on the UI screen.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
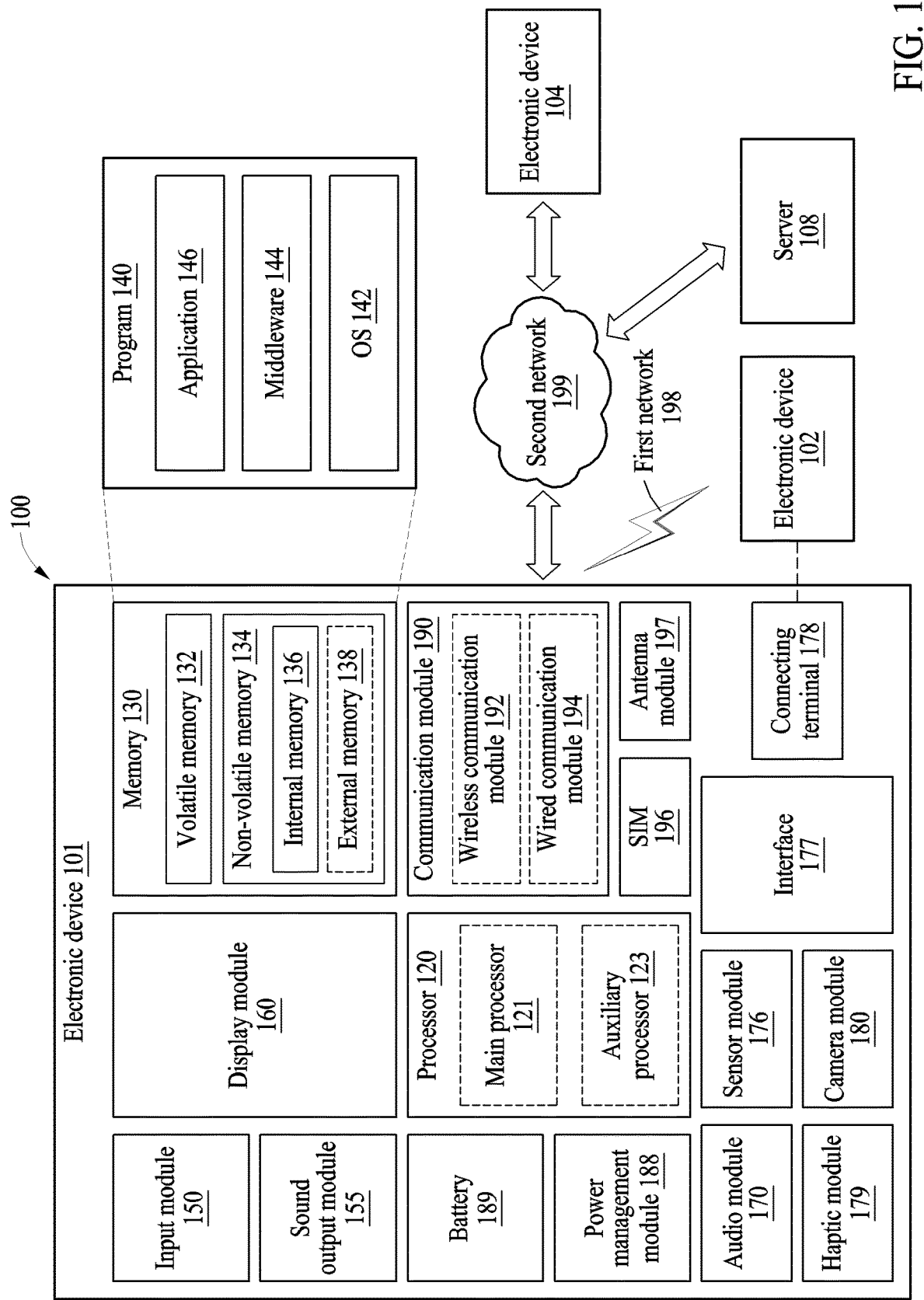
FIG. 1 is a block diagram illustrating an electronic device in a network environment according to one embodiment.

Hereinafter, embodiments will be described in detail with reference to the accompanying drawings. When describing the embodiments with reference to the accompanying drawings, like reference numerals refer to like elements and a repeated description related thereto will be omitted. Embodiments described herein are example embodiments, and thus, the disclosure is not limited thereto.

FIG. 1 is a block diagram illustrating an electronic device 101 in a network environment 100 according to one embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more of other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An artificial intelligence (AI) model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but examples of which are not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive, from the outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside the electronic device 101. The sound output module 155 may include, for example, a speaker or a receiver. The speaker may be used for general purposes, such as playing multimedia or playing a record. The receiver may be used to receive an incoming call. According to one embodiment, the receiver may be implemented separately from the speaker or as a portion of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch. The display module 160 may be exemplarily implemented in a foldable structure and/or a rollable structure. For example, a size of a display screen of the display module 160 may be reduced when folded and expanded when unfolded.

The audio module 170 may convert sound into an electric signal or vice versa. According to one embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more of specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a portion of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more of communication processors that operate independently of the processor 120 (e.g., an AP) and support direct (e.g., wired) communication or wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one embodiment, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to one embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more of external electronic devices to perform at least portion of the function or the service. The one or more of external electronic devices receiving the request may perform the at least part of the function or service, or an additional function or an additional service related to the request, and may transfer an outcome of the performing to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
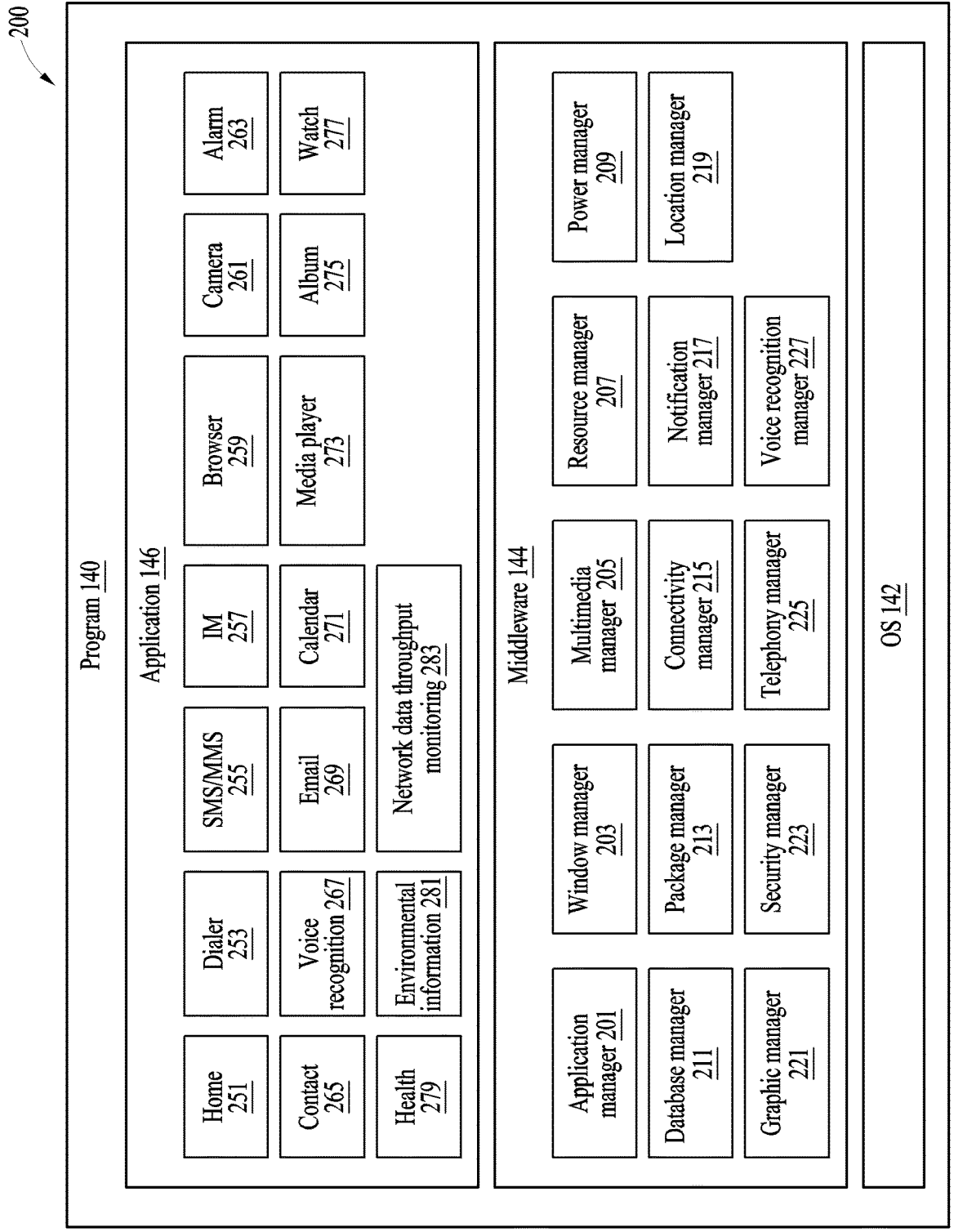
FIG. 2 is a block diagram illustrating a program according to one embodiment.

FIG. 2 is a block diagram 200 illustrating the program 140 according to one embodiment. According to one embodiment, the program 140 may include an OS 142 to control one or more of resources of the electronic device 101, middleware 144, or an application 146 executable in the OS 142. The OS 142 may include, for example, Android™ iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more of driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more of graphical user interface (GUI) resources that are used on a screen. The multimedia manager 205, for example, may identify one or more formats to be used to play media files, and may encode or decode a corresponding one of the media files using a codec appropriate for a corresponding format selected from the one or more of formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to one embodiment, the power manager 209 may interwork with a basic input/output system (BIOS) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a UI related to the one or more of graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to one embodiment, the middleware 144 may dynamically delete some existing components or add new components. According to one embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to one embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support installation, delete, or update of an application running on the external electronic device.

According to one embodiment, the application 146 may display one or more of game applications and a GPU watch application that displays GPU related information.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more of functions. For example, according to one embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101 of FIG. 1). For example, a processor (e.g., the processor 120) of the machine (e.g., the electronic device 101) may invoke at least one of the one or more of instructions stored in the storage medium, and execute it. This allows the machine to be operated to perform at least one function according to the at least one instruction invoked. The one or more of instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more of other components may be added. Alternatively or additionally, a plurality of components (e.g., modules or programs) may be integrated into a single component. In such a case, according to various example embodiments, the integrated component may still perform one or more of functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more of other operations may be added.

Figure 3:
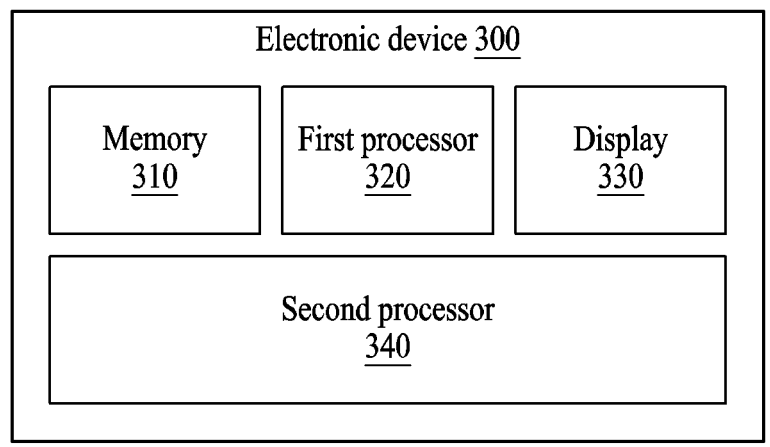
FIG. 3 is a block diagram illustrating an example of an electronic device according to one embodiment.

FIG. 3 is a block diagram illustrating an example of an electronic device 300 according to one embodiment.

According to one embodiment, the electronic device 300 of FIG. 3 (e.g., the electronic device 101 of FIG. 1) may include a memory 310 (e.g., the memory 130 of FIG. 1), a first processor 320 (e.g., the auxiliary processor 123 of FIG. 1), a display 330 (e.g., the display module 160 of FIG. 1), and a second processor 340 (e.g., the main processor 121 of FIG. 1).

According to one embodiment, the first processor 320 may correspond to a GPU, and the second processor 340 may correspond to a CPU.

According to one embodiment, the first processor 320 and the second processor 340 may be included in an application processor (AP). The AP may be configured as a System on Chip (SoC) so as to include the first processor 320 and the second processor 340.

According to one embodiment, the first processor 320 may perform a graphics pipeline based on graphics data. Graphics data may include, for example, at least one or all of vertex data, index data, attribute data, a shader, and/or a texture, but examples are not limited thereto.

According to one embodiment, the memory 310 may store a first application (e.g., a game application) and a second application (e.g., the GPU watch application described with reference to FIG. 2) that obtains and/or displays information on the first processor 320.

According to one embodiment, the second application may include a render stage processing portion for processing render stage information of the first processor 320 and/or a render stage information receiver for obtaining (or receiving) render stage information from the first processor 320. In one embodiment, the render stage information processing portion and/or the render stage information receiver may be in a form of a library, however, embodiments are not limited thereto. In one embodiment, the second processor 340 may receive render stage information for each process of a running application (e.g., the first application and/or the second application) from the first processor 320 through the render stage information receiver and extract render stage information of a target application (e.g., the first application) from the received render stage information.

According to one embodiment, in response to a request (e.g., a touch input of a user for an icon of the second application) to execute the second application, the second processor 340 may execute the second application. In response to a request (e.g., a touch input of a user for an icon of the first application) to execute the first application, the second processor 340 may execute the first application. In one embodiment, a user may execute the first application after executing the second application for obtaining render stage information smoothly. The second processor 340 may use a function of a graphics rendering library (e.g., an open graphics library embedded system (GLES) and Vulkan) by calling a graphics API through the first application.

According to one embodiment, when the first application is running, the first processor 320 may perform graphics processing based on graphics data of the first application. For example, the first processor 320 may perform render operation stages. The render operation stages may include, for example, a binning operation, a rendering operation, a color storing operation, and a blit (block image transfer) operation, which is a data copying operation. However, embodiments are not limited thereto. The second processor 340 may generate frames to be output on the display 330 through graphics processing.

According to one embodiment, the second processor 340 may obtain or receive render stage information of the frames from the first processor 320 through the executed second application.

According to one embodiment, the second processor 340 may extract render stage information of a first frame (e.g., a frame preceding a most recent frame) from the render stage information of the frames. As described below, the render stage information of the most recent frame extracted from the render stage information of the frames may be generated in a state in which graphics processing is not completed. The second processor 340 may extract the render stage information of the first frame (e.g., the frame preceding the most recent frame) from the render stage information of the frames. Hereinafter, the render stage information of the first frame is referred to as "first render stage information". In one embodiment, the second processor 340 may divide the render stage information of the frames for each of the frames based on a queue submission time of a first graphics rendering library (e.g., Vulkan) and extract the first render stage information from a result of the division. An example embodiment thereof is described in detail with reference to FIGS. 4 and 5. In one embodiment, the second processor 340 may divide the render stage information of the frames for each of the frames based on a usage pattern of frame buffers and extract the first render stage information from a result of the division. An example embodiment thereof is described in detail with reference to FIGS. 6 and 7.

Figure 4:
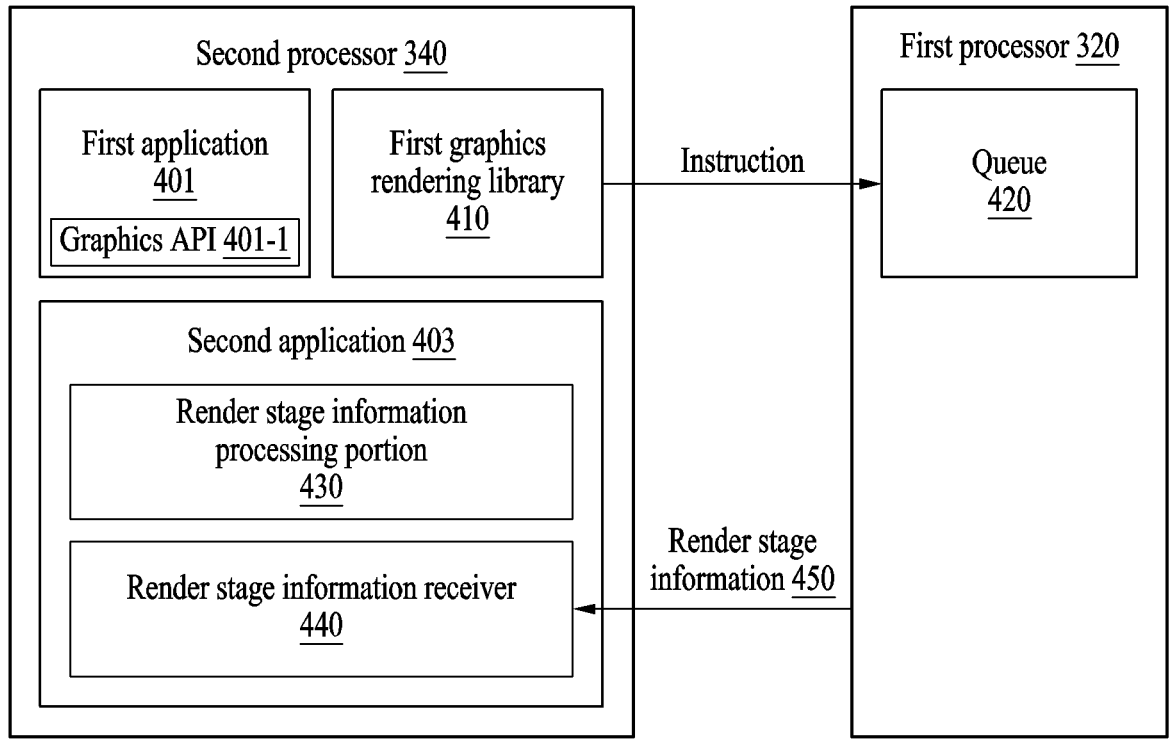
FIGS. 4 and 5 are diagrams illustrating an example in which an electronic device extracts first render stage information from render stage information of frames according to one embodiment.
Figure 5:
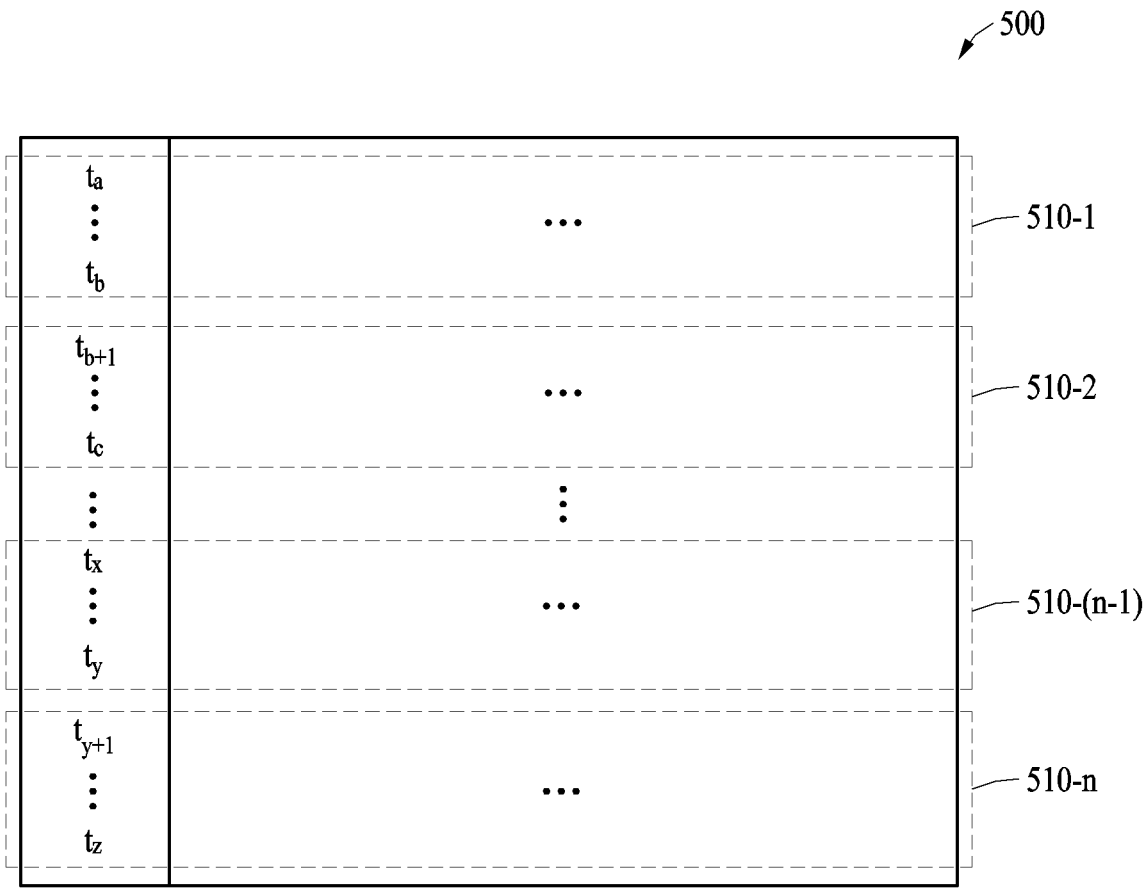

FIGS. 4 and 5 are diagrams illustrating an example in which an electronic device extracts first render stage information from render stage information of frames according to one embodiment.

According to one embodiment, the second processor 340 may execute a second application 403. The second processor 340 may execute a first application 401 (e.g., a game application).

According to one embodiment, in response to executing the first application 401, the second processor 340 may use a function of a first graphics rendering library 410 (e.g., Vulkan) by calling or by using a graphics API 401-1 through the first application 401. In one embodiment, the first application 401 may use a function of the first graphics rendering library 410 using or by calling the graphics API 401-1.

According to one embodiment, the second processor 340 may allocate a queue 420 for storing data to a memory dedicated to the first processor 320 through the first graphics rendering library 410. In one embodiment, the memory dedicated to the first processor 320 may be a memory in the first processor. In one embodiment, the memory dedicated to the first processor 320 may be a memory included in a memory (e.g., the memory 132 of FIG. 1 and the memory 310 of FIG. 3).

According to one embodiment, the second processor 340 may perform queue submission through the first graphics rendering library 410. The queue submission may be an operation in which the second processor 340 may enqueue one or more of instructions to the queue 420 through the first graphics rendering library 410 so that graphics processing for outputting (or generating) a frame is performed.

Referring to FIG. 4, the second processor 340 may perform the queue submission at a time $t_1$ through the first graphics rendering library 410 so that graphics processing for generating a $frame_1$ is performed. The first processor 320 may generate the $frame_1$ by performing graphics processing (e.g., render operation stages). For example, the first processor 320 may generate the $frame_1$ using render passes. Each of the render passes may perform one or more of render operation stages.

Referring to FIG. 4, the second processor 340 may perform the queue submission at a time $t_2$ through the first graphics rendering library 410 so that graphics processing for generating a $frame_2$ is performed. The first processor 320 may generate the $frame_2$ using the render passes. The second processor 340 may perform the queue submission at a time $t_{n-1}$ through the first graphics rendering library 410 so that graphics processing for generating a $frame_{n-1}$ is performed. The first processor 320 may generate the $frame_{n-1}$ using the render passes. The second processor 340 may perform the queue submission at a time $t_n$ through the first graphics rendering library 410 so that graphics processing for generating a frame, is performed. The first processor 320 may generate the $frame_n$ using the render passes.

According to one embodiment, the second processor 340 may obtain render stage information 450 of frames (e.g., frames $frame_1$ to $frame_n$) from the first processor 320 through a second library 440 of the second application 403. FIG. 5 illustrates an example of the render stage information 450.

Referring to FIG. 5, render stage information 500 of frames may include render stage information of frames $frame_1$ to frame, for a series of times (e.g., times $t_a$ to $t_z$ of FIG. 5). Render stage information of each of the frames may include, for example, an operation time of each of render passes of each of the frames and a render stage performed by each of the render passes of each of the frames. However, examples are not limited thereto. The render stage information 500 of FIG. 5 may not be divided for each of the frames.

According to one embodiment, the second processor 340 may divide the render stage information 500 for each of the frames based on a queue submission time through the render stage information processing portion 430. Referring to FIG. 5, the second processor 340 may obtain a queue submission time of each of the frames $frame_1$ to frame, through the first graphics rendering library 410 and divide the render stage information 500 into render stage information for each of the frames based on each of the obtained submission times through the render stage information processing portion 430. In response to an interval from a time $t_a$ to a time $t_b$ of the render stage information 500 corresponding to an interval from a queue submission time $t_1$ for the $frame_1$ to a queue submission time $t_2$ for a $frame_2$, the second processor 340 may identify or determine render stage information 510-1 in the interval from the time $t_a$ to the time $t_b$ as render stage information of the $frame_1$ (or render stage information during the $frame_1$) through the render stage information processing portion 430. In response to an interval from a time $t_{b+1}$ to a time $t_c$ of the render stage information 500 corresponding to an interval from the queue submission time $t_2$ for the $frame_2$ to a queue submission time $t_3$ for a $frame_3$, the second processor 340 may identify or determine render stage information 510-2 in the interval from the time $t_{b+1}$ to the time $t_c$ as render stage information of the $frame_2$ (or render stage information during the $frame_2$) through the render stage information processing portion 430. In response to an interval from a time $t_x$ to a time $t_y$ of the render stage information 500 corresponding to an interval from a queue submission time $t_{n-1}$ for a $frame_{n-1}$ to a queue submission time $t_n$ for a $frame_n$, the second processor 340 may identify or determine render stage information 510-(n-1) in the interval from the time $t_x$ to the time $t_y$ as render stage information of the $frame_{n-1}$ (or render stage information during the $frame_{n-1}$) through the render stage information processing portion 430. The second processor 340 may identify or determine render stage information 510-n in an interval from a time $t_{y+1}$ to a time $t_z$ in the render stage information 500 of FIG. 5 as render stage information of the $frame_n$ (or render stage information during the $frame_n$) through the render stage information processing portion 430.

According to one embodiment, the second processor 340 may extract or obtain render stage information of a frame preceding a most recent frame rather than render stage information of the most recent frame (or the last frame) from the render stage information divided for each of the frames. The render stage information of the most recent frame may be generated in a state in which graphics processing is not completed. The second processor 340 may extract the render stage information of the frame preceding the most recent frame rather than the render stage information of the most recent frame. Referring to FIG. 5, the second processor 340 may extract the render stage information 510-(n-1) of the $frame_{n-1}$ from the render stage information divided for each of the frames.

According to one embodiment, the second processor 340 may process the extracted first render stage information (e.g., the render stage information 510-(n-1)). For example, the render stage information 510-(n-1) may include an operation time of each of render passes of the $frame_{n-1}$ and a render stage performed by each of the render passes. The second processor 340 may sort the render stage information 510-(n-1) by the operation time of each of the render passes of the $frame_{n-1}$.

According to one embodiment, in at least some or all of the frames (e.g., the frames $frame_1$ to $frame_n$), an execution screen of the first application 401, an execution screen of the second application 403, and an execution screen of a third application (e.g., a notification application for displaying a state) may be synthesized. According to one embodiment, the first processor 320 may draw the execution screen of the second application 403. The third application may be running, and the first processor 320 may draw the execution screen of the third application. The first processor 320 may generate a frame or an image in which the execution screen of the first application 401, the execution screen of the second application 403, and the execution screen of the third application are synthesized.

According to one embodiment, render stage information (e.g., the render stage information 450 of FIG. 4) of the frames may include, for example, render stage information corresponding to the first application 401, render stage information corresponding to the second application 403, and render stage information corresponding to the third application. The second processor 340 may extract the render stage information (e.g., the render stage information 500 of FIG. 5) corresponding to the first application 401 from obtained render stage information (e.g., the render stage information 450 of FIG. 4). The obtained render stage information (e.g., the render stage information 450 of FIG. 4) may include render stage information respectively corresponding to a plurality of running applications (e.g., the first application 401, the second application 403, and the third application). The second processor 340 may identify a target application (e.g., the first application 401) among the plurality of running application (e.g., the first application 401, the second application 403, and the third application). The second processor 340 may extract render stage information corresponding to the target application (e.g., the first application 401) among the obtained render stage information (e.g., the render stage information 450 of FIG. 4). For example, the second processor 340 may identify a process identification (ID) of the first application 401 through the render stage information receiver 440 and extract the render stage information corresponding to the first application 401 from the render stage information 450 using the process ID of the first application 401.

According to one embodiment, the second processor 340 may divide the render stage information corresponding to the first application 401 for each of the frames, extract the first render stage information (e.g., the render stage information 510-(n-1)) from the render stage information divided for each of the frames, and process the extracted first render stage information.

Figure 6:
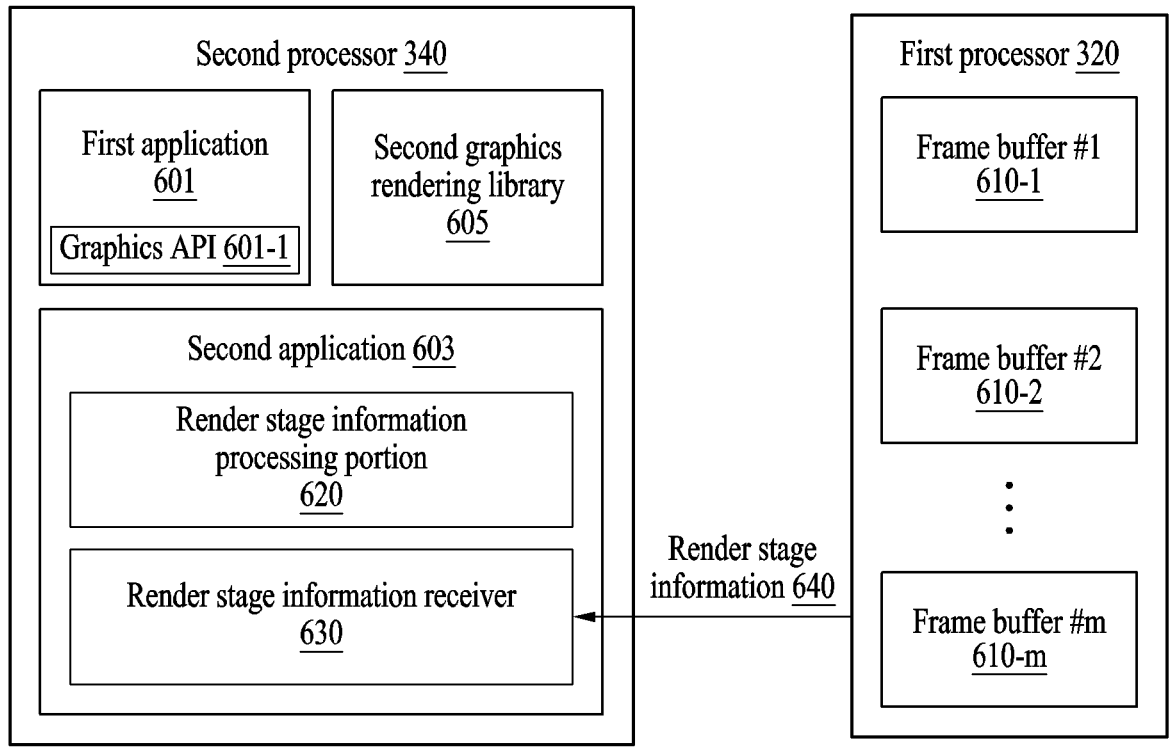
FIGS. 6 and 7 are diagrams illustrating another example in which an electronic device extracts first render stage information from render stage information of frames according to one embodiment.
Figure 7:
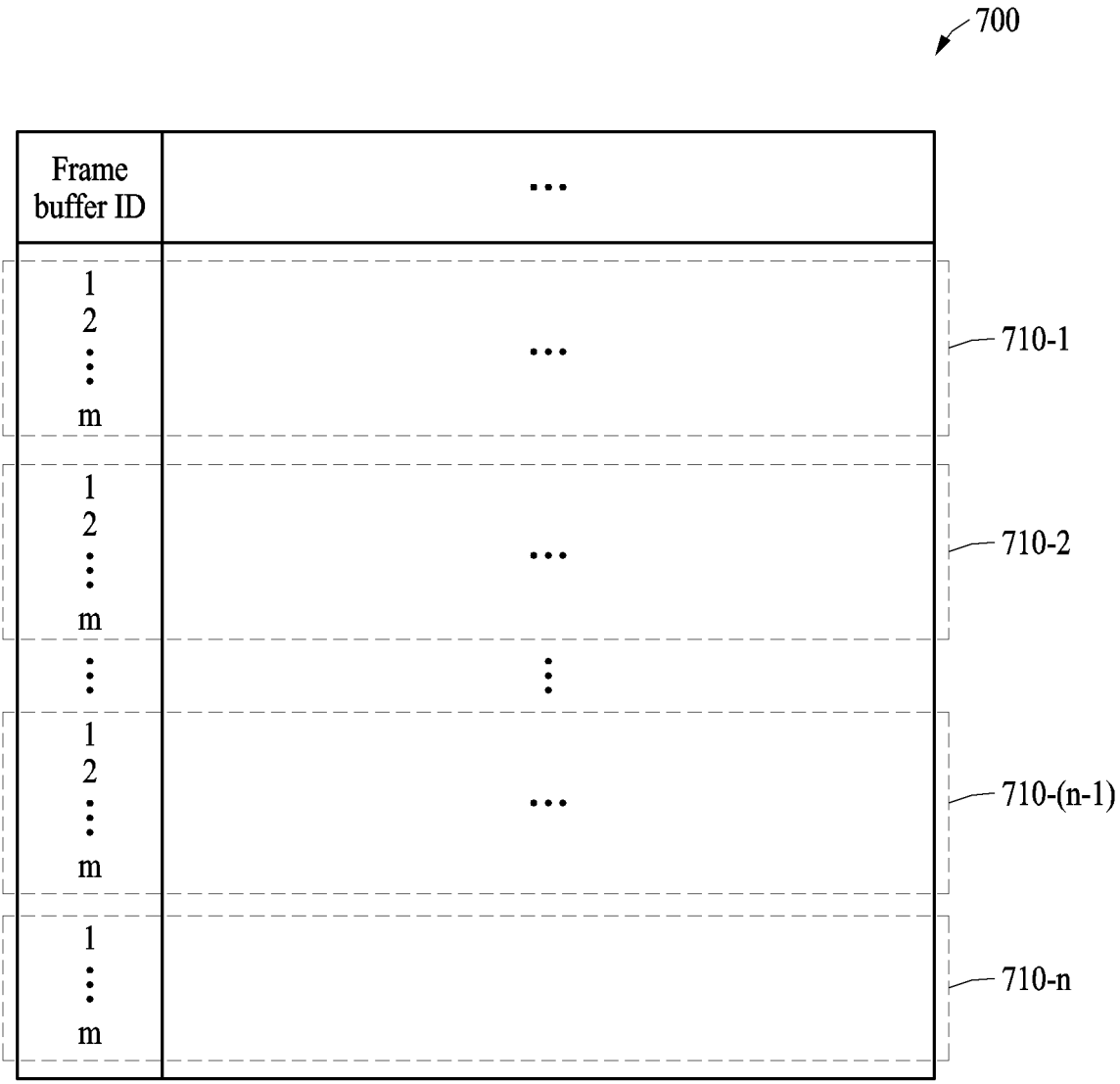

FIGS. 6 and 7 are diagrams illustrating another example in which an electronic device extracts first render stage information from render stage information of frames according to one embodiment.

According to one embodiment, the second processor 340 may execute a second application 603. The second processor 340 may execute a first application 601 (e.g., a game application).

According to one embodiment, in response to executing the first application 601, the second processor 340 may use a function of a second graphics rendering library 605 (e.g., an openGLES) by calling or by using a graphics API 601-1 through the first application 601. In one embodiment, the first application 601 may use a function of the second graphics rendering library 605 using or by calling the graphics API 601-1.

According to one embodiment, the second processor 340 may allocate frame buffers 610-1 to 601-m through the second graphics rendering library 605 so that graphics processing is performed on graphics data of the first application 601. In one embodiment, the second processor 340 may allocate the frame buffers 610-1 to 610-m to a memory in the first processor 320 through the second graphics rendering library 605. In one embodiment, the second processor 340 may allocate the frame buffers 610-1 to 610-m to a memory (e.g., the memory 132 of FIG. 1 and the memory 310 of FIG. 3) through the second graphics rendering library 605.

According to one embodiment, each of the frame buffers 610-1 to 610-m may be a graphic buffer allocated to the first application 601 by a kernel (e.g., a memory manager). For example, in response to a buffer being allocated by the kernel, the second processor 340 may allocate graphic buffers (e.g., the frame buffers 610-1 to 610-m) to a memory in the first processor 320 or a memory (e.g., the memory 132 of FIG. 1 and the memory 310 of FIG. 3) through the second graphics rendering library 605. In one embodiment, each of the frame buffers 610-1 to 610-m may be a frame buffer of a second graphics API and correspond to a frame buffer object (FBO) capable of using a color, a depth, and a stencil attachment.

According to one embodiment, the first processor 320 may generate frames (e.g., frames $frame_1$ to $frame_n$) on which an execution screen of the first application 601 is drawn using the frame buffers 610-1 to 610-m repeatedly in an order of a frame buffer #1 610-1, a frame buffer #2 610-2, . . . , and a frame buffer #m 610-m. For example, the first processor 320 may generate a $frame_1$ using the frame buffers 610-1 to 610-m in the order of the frame buffer #1 610-1, the frame buffer #2 610-2, . . . , and the frame buffer #m 610-m. The first processor 320 may generate a $frame_2$ using the frame buffers 610-1 to 610-m in the order of the frame buffer #1 610-1, the frame buffer #2 610-2, . . . , and the frame buffer #m 610-m. The first processor 320 may generate a $frame_n$ using the frame buffers 610-1 to 610-m in the order of the frame buffer #1 610-1, the frame buffer #2 610-2, . . . , and the frame buffer #m 610-m.

According to one embodiment, the second processor 340 may obtain render stage information 640 of the frames (e.g., the frames $frame_1$ to $frame_n$) from the first processor 320 through a render stage information receiver 630 of the second application 603. FIG. 7 illustrates an example of the render stage information 640.

Referring to FIG. 7, render stage information 700 may include an ID of each of the frame buffers 610-1 to 610-m and render stage information of each of frames $frame_1$ to $frame_n$. Render stage information of each of the frames may include, for example, an operation time of each of the frame buffers 610-1 to 610-m and a type of render stage performed by the first processor 320 using each of the frame buffers 610-1 to 610-m. However, examples are not limited thereto. The operation time of each of the frame buffers 610-1 to 610-m may be, for example, a time at which the first processor 320 performs a render stage using each of the frame buffers 610-1 to 610-m. For example, the first processor (e.g., the first processor 320 of FIG. 3) may perform a binning operation for 1.5 milliseconds (ms) and a rendering operation for 0.5 ms using a frame buffer 610-1, and an operation time of the frame buffer 610-1 may be 2 ms when no other operations are being performed. The render stage information 700 of FIG. 7 may not be divided for each of the frames.

According to one embodiment, a second processor (e.g., the second processor 340 of FIG. 3) may divide the render stage information 700 for each of the frames based on a usage pattern of the frame buffers 610-1 to 610-m through the render stage information processing portion 620. Referring to FIG. 7, the second processor 340 may be aware that the frame buffers 610-1 to 610-m are being used in the order of the frame buffer #1 610-1, the frame buffer #2 610-2, . . . , and the frame buffer #m 610-m for performing graphics processing on a frame. The second processor 340 may be aware of a usage pattern of the frame buffers 610-1 to 610-m. The second processor 340 may identify or determine render stage information corresponding to an interval in which a frame buffer ID starts at 1 and ends at m as render stage information of an individual frame in the render stage information 700 through the render stage information processing portion 620. In the render stage information 700, the second processor 340 may identify or determine render stage information 710-1 as render stage information of a $frame_1$ through the render stage information processing portion 620 and identify or determine render stage information 710-2 as render stage information of a $frame_2$ through the render stage information processing portion 620. In the render stage information 700, the second processor 340 may identify or determine render stage information 710-($n$–1) as render stage information of a $frame_{n-1}$ through the render stage information processing portion 620 and identify or determine render stage information 710-$n$ as render stage information of a $frame_n$ through the render stage information processing portion 620.

According to one embodiment, the second processor 340 may extract or obtain render stage information of a frame preceding a most recent frame rather than render stage information of the most recent frame (or the last frame) from the render stage information divided for each of the frames. Referring to FIG. 7, graphics processing performed on the $frame_n$ may not be completed, and the second processor 340 may extract the render stage information 710-($n$–1) of the $frame_{n-1}$ from the render stage information 700.

According to one embodiment, the second processor 340 may process the extracted first render stage information (e.g., the render stage information 710-($n$–1)). For example, the render stage information 710-($n$–1) may include an operation time of each of the frame buffers 610-1 to 610-m of the $frame_{n-1}$ and a render stage performed by each of the frame buffers 610-1 to 610-m of the $frame_{n-1}$. The second processor 340 may sort the render stage information 710-($n$–1) by the operation time of each of the frame buffers 610-1 to 610-m.

According to one embodiment, a third application (e.g., a notification application for displaying a state) may be running. Render stage information (e.g., the render stage information 640 of FIG. 6) of the frames may include render stage information respectively corresponding to a plurality of running applications (e.g., the first application 601, the second application 603, and the third application).

According to one embodiment, the second processor 340 may extract render stage information (e.g., the render stage information 700 of FIG. 7) corresponding to the first application 601 from the obtained render stage information 640. The second processor 340 may identify a target application (e.g., the first application 601) among the plurality of running application (e.g., the first application 601, the second application 603, and the third application). The second processor 340 may extract render stage information corresponding to the target application (e.g., the first application 601) from the obtained render stage information 640. For example, the second processor 340 may identify a process ID of the first application 601 through the render stage information receiver 630 and extract the render stage information (e.g., the render stage information 700 of FIG. 7) corresponding to the first application 601 from the render stage information 640 using the process ID of the first application 601. The second processor 340 may divide the render stage information corresponding to the first application 601 for each of the frames, extract the first render stage information (e.g., the render stage information 710-($n$–1)) from the render stage information divided for each of the frames, and process the extracted first render stage information.

Figure 8:
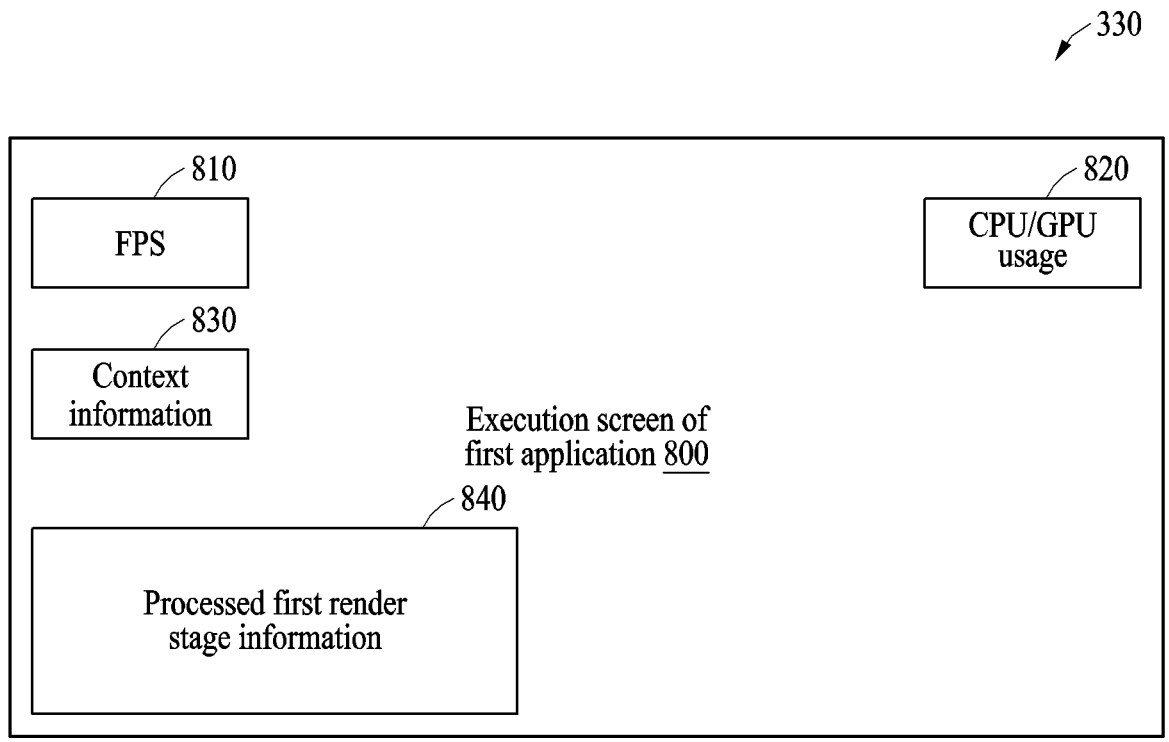
FIGS. 8 to 10 are diagrams illustrating an example of execution screens of first and second applications according to one embodiment.
Figure 9:
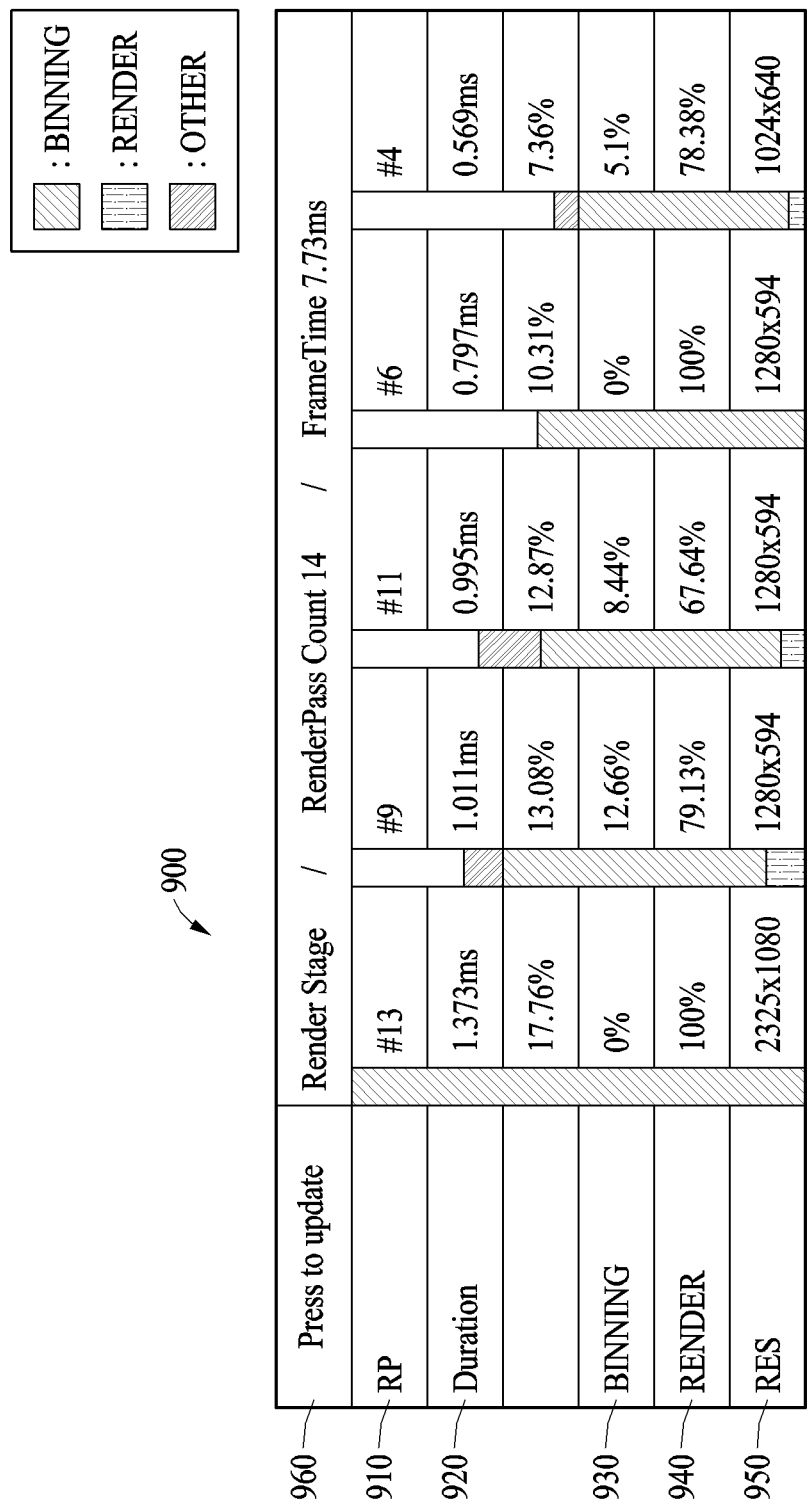
Figure 10:
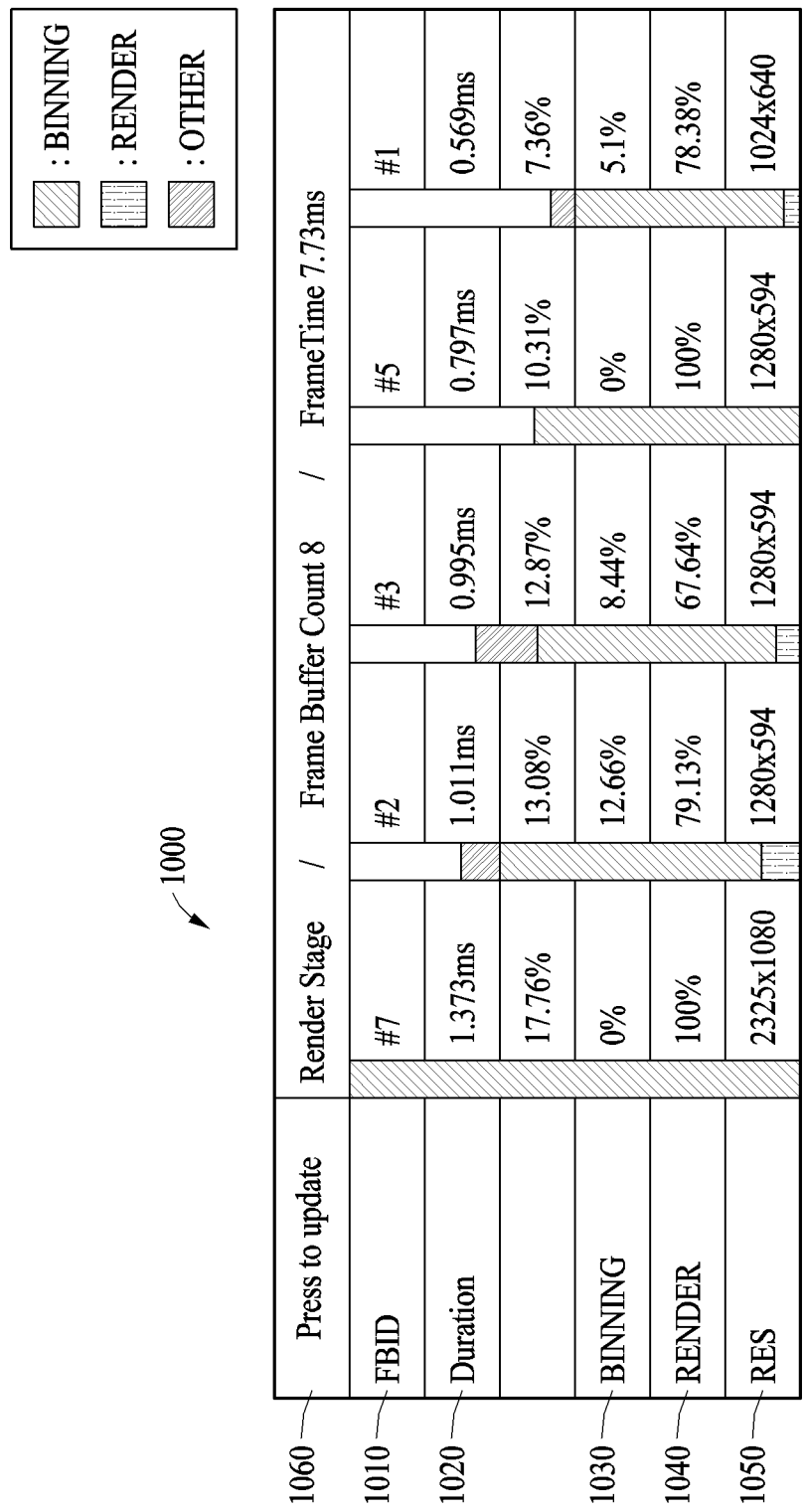

FIGS. 8 to 10 are diagrams illustrating an example of execution screens of first and second applications according to one embodiment.

According to one embodiment, the second processor 340 may control the display 330 to display an execution screen 800 of a first application.

According to one embodiment, the second processor 340 may control the display 330 to display an execution screen (e.g., a UI screen including items (e.g., a first item 810, a second item 820, a third item 830, and a fourth item 840)) of a second application on the execution screen 800 of the first application.

The second processor 340 may control the display 330 to display, on the display 330, an image or a frame in which the execution screen 800 of the first application and an execution screen (e.g., the UI screen including the items (e.g., the first item 810, the second item 820, the third item 830, and the fourth item 840) of the second application are synthesized.

According to one embodiment, the first item 810 may be frames per second (FPS), the second item 820 may be a CPU/GPU usage, the third item 830 may be context information, and the fourth item 840 may be processed first render stage information and an update button to be described later.

FIG. 9 illustrates an example of the fourth item 840, which is the processed first render stage information and the update button.

A fourth item 900 shown in FIG. 9 may include a result of sorting the render stage information 510-($n$–1) of FIG. 5 by an operation time of each of render passes of a frame$_{n-1}$ and an update button 960.

Referring to FIG. 9, a number of the render passes of the frame$_{n-1}$ may be 14, and a frame time of the frame$_{n-1}$ may be 7.73 ms. Render pass (RP) 910 may indicate an order of the render passes, duration 920 may indicate an operation time of a render pass, binning 930 and render 940 may each indicate a type of a render stage. Resolution (RES) 950 may indicate a resolution of a result image of a render pass. Depending on the implementation, RES 950 may be omitted.

For example, FIG. 9 illustrates information on each of some of the render passes rather than information on all of the 14 render passes.

As illustrated in FIG. 9, #13 may indicate a thirteenth performed render pass among the 14 render passes after the frame$_{n-1}$ has started. An operation time of the render pass #13 may be 1.373 ms, and a proportion of the operation time (1.373 ms) of the render pass #13 may be 17.76% of the frame time (7.73 ms). The render pass #13 did not perform a binning operation and performed a rendering operation. 100% of the operation time was used for performing the rendering operation. A result image of the render pass #13 may have a resolution of 2325×1080. A bar graph corresponding to the proportion (100%) of the time used to perform the rendering operation to the operation time may be displayed on the left side of the information on the render pass #13.

As illustrated in FIG. 9, #9 may indicate a ninth performed render pass among the 14 render passes after the frame$_{n-1}$ has started. An operation time of the render pass #9 may be 1.011 ms, and a proportion of the operation time (1.011 ms) of the render pass #9 may be 13.08% of the frame time (7.73 ms). The render pass #9 performed a binning operation, a rendering operation, and operations (other operations) other than the binning and rendering operations. 12.66% of the operation time was used for performing the binning operation, 79.13% of the operation time was used for performing the rendering operation, and 8.21% of the operation time was used for performing the other operations. A result image of the render pass #9 may have a resolution of 1280×594. Bar graphs corresponding to the proportions of the times used to perform the binning operation, rendering operation, and other operations, respectively, to the operation time may be displayed on the left side of the information on the render pass #9.

The description of each of the render passes #13 and #9 provided in FIG. 9 may apply to each of render passes #11, #6, and #4.

According to one embodiment, a second processor (e.g., the second processor 340 of FIG. 3) may detect a user input (e.g., a touch input) on the update button 960. The second processor 340 may obtain render stage information of frames (e.g., frames subsequent to a first frame) through a second application. The second processor 340 may extract render stage information (hereinafter, referred to as "second render stage information") of a second frame from render stage information of the frames subsequent to the first frame. For example, the second processor 340 may divide the render stage information of the frames subsequent to the first frame for each of the frames based on a submission time for each of the frames subsequent to the first frame. The second processor 340 may extract the second render stage information (e.g., render stage information of a frame preceding a most recent frame) from the render stage information divided for each of the frames. The second processor 340 may process the extracted second render stage information. The second processor 340 may update (or change) processed first render stage information to the processed second render stage information in a fourth item 900 on a UI screen. A user may identify the updated render stage information.

FIG. 10 illustrates another example of the fourth item, which is the processed first render stage information and the update button.

A fourth item 1000 shown in FIG. 10 may include a result of sorting the render stage information 710-($n$–1) of FIG. 7 by an operation time of each of frame buffers of a frame$_{n-1}$ and an update button 1060.

Referring to FIG. 10, a number of the frame buffers (e.g., the frame buffers 610-1 to 610-$m$ of FIG. 6) of the frame$_{n-1}$ may be 8, and a frame time of the frame$_{n-1}$ may be 7.73 ms. Frame buffer ID (FBID) 1010 may indicate an ID of a frame buffer, duration 1020 may indicate an operation time of a frame buffer, and binning 1030 and render 1040 may each indicate a type of a render stage. RES 1050 may indicate a resolution of an image in a frame buffer. Depending on the implementation, RES 1050 may be omitted.

For example, FIG. 10 illustrates information on each of some of the frame buffers rather than information on all of the 8 frame buffers.

Referring to FIG. 10, an operation time of a frame buffer #7 may be 1.373 ms, and a proportion of the operation time (1.373 ms) of the frame buffer #7 may be 17.76% of the frame time 7.73 ms. When using the frame buffer #7, the first processor 320 did not perform a binning operation and performed a rendering operation. 100% of the operation time was used for performing the rendering operation. An image in the frame buffer #7 may have a resolution of 2325×1080. A bar graph corresponding to the proportion (100%) of the time used to perform the rendering operation to the operation time may be displayed on the left side of the information on the frame buffer #7.

Referring to FIG. 10, an operation time of a frame buffer #2 may be 1.011 ms, and a proportion of the operation time (1.011 ms) of the frame buffer #2 may be 13.08% of the frame time 7.73 ms. The first processor 320 performed a binning operation, a rendering operation, and operations (other operations) other than the binning and rendering operations when using the frame buffer #2. 12.66% of the operation time was used for performing the binning operation, 79.13% of the operation time was used for performing the rendering operation, and 8.21% of the operation time was used for performing the other operations. An image in the frame buffer #2 may have a resolution of 1280×594. Bar graphs corresponding to the proportions of the times used to perform the binning operation, rendering operation, and other operations, respectively, to the operation time may be displayed on the left side of the information on the frame buffer #2.

The description of each of the frame buffers #7 and #2 provided in FIG. 10 may apply to each of frame buffers #3, #5, and #1.

According to one embodiment, a second processor (e.g., the second processor 340 of FIG. 3) may detect a user input (e.g., a touch input) on the update button 1060. The second processor 340 may obtain render stage information of frames (e.g., frames subsequent to a first frame) through a second application. The second processor 340 may extract second render stage information from render stage information of frames (e.g., the frames subsequent to the first frame). For example, the second processor 340 may divide render stage information of the frames subsequent to the first frame for each of the frames based on a usage pattern of frame buffers (e.g., the 8 frame buffers of FIG. 10) and extract the second render stage information (e.g., render stage information of a frame preceding a most recent frame) from the render stage information divided for each of the frames. The second processor 340 may process the extracted second render stage information, and in the fourth item 1000, the second processor 340 may update or change processed first render stage information to the processed second render stage information. A user may identify the updated render stage information.

Figure 11:
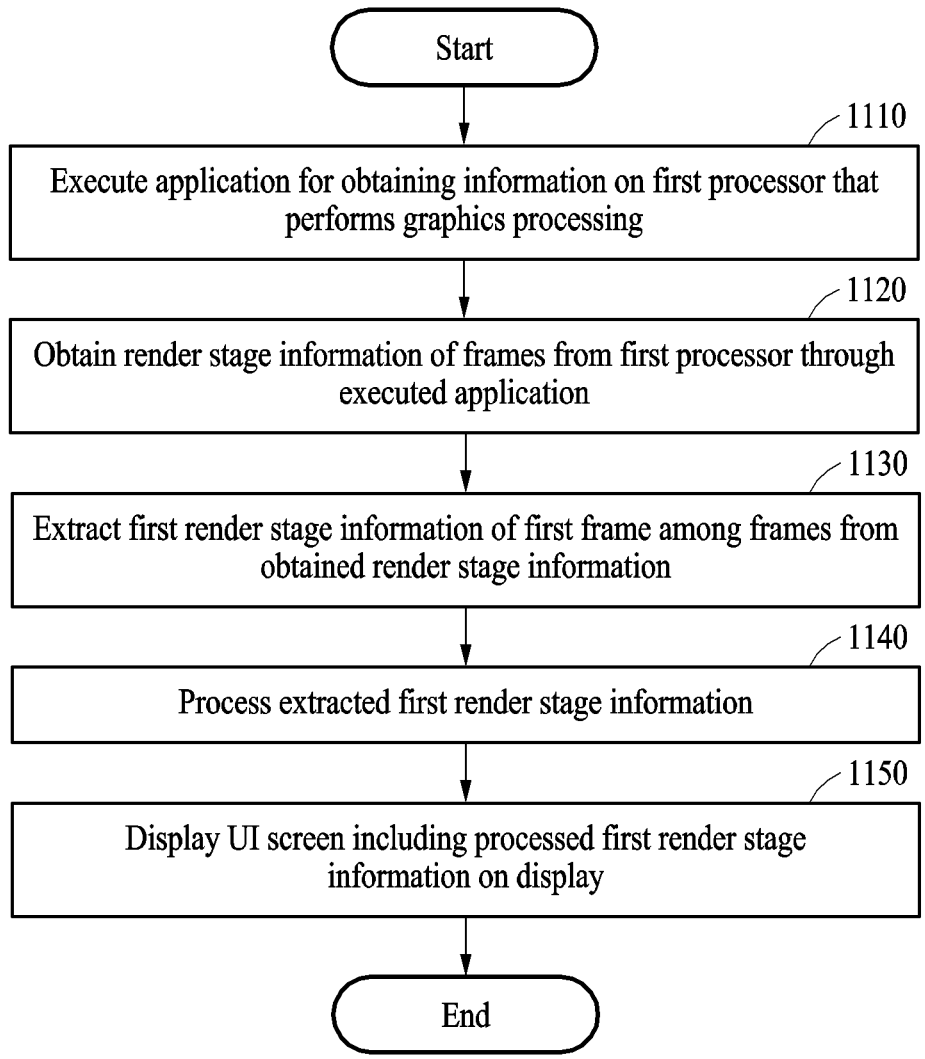
FIG. 11 is a flowchart illustrating an operating method of an electronic device according to one embodiment.

FIG. 11 is a flowchart illustrating an operating method of an electronic device according to one embodiment.

In operation 1110, the electronic device 300 (e.g., the second processor 340 of FIG. 3) may execute an application (e.g., the second application described with reference to FIGS. 3 to 10) for obtaining information on the first processor 320 that performs graphics processing (e.g., render operation stages).

In operation 1120, the electronic device 300 may obtain render stage information (e.g., the render stage information 500 of FIG. 5 and the render stage information 700 of FIG. 7) of frames through the executed application.

In operation 1130, the electronic device 300 may extract first render stage information (e.g., the render stage information 510-($n-1$) of FIG. 5 and the render stage information 710-($n-1$) of FIG. 7) of a first frame among frames from the obtained render stage information.

In operation 1140, the electronic device 300 may process the extracted first render stage information.

In operation 1150, the electronic device 300 may control the display 330 to display a UI screen (e.g., the UI screen including the items (e.g., the first item 810, the second item 820, the third item 830, and the fourth item 840)) including the processed first render stage information (e.g., the fourth item 900 of FIG. 9 and the fourth item 1000 of FIG. 10).

The description provided with reference to FIGS. 1 to 10 may also apply to FIG. 11, and thus, a detailed description thereof is omitted.

According to one embodiment, an electronic device (e.g., the electronic device 101 of FIG. 1 and the electronic device 300 of FIG. 3) may include a first processor 320 that generates frames by performing render operation stages based on graphics data, a memory 310 that stores an application (e.g., a second application) for obtaining information on the first processor 320, a display 330, and a second processor 340 electrically connected to the first processor 320, the memory 310, and the display 330.

According to one embodiment, the second processor 340 may execute an application (e.g., the second application), obtain render stage information (e.g., the render stage information 450 of FIG. 4 and the render stage information 640 of FIG. 6) of the frames through the executed application, extract first render stage information of a first frame among the frames from the obtained render stage information, process the extracted first render stage information, and display a UI screen including the processed first render stage information on the display 330.

According to one embodiment, the second processor 340 may divide the obtained render stage information for each of the frames based on a queue submission time of a first graphics rendering library (e.g., Vulkan) and extract the first render stage information from a result of the division.

According to one embodiment, the extracted first render stage information may include an operation time of each of render passes of the first frame.

According to one embodiment, the second processor 340 may sort the extracted first render stage information by the operation time of each of the render passes.

According to one embodiment, the second processor 340 may control the display 330 to display a bar graph corresponding to a proportion of an operation time used by each of the render passes to perform an individual render operation stage to the operation time of each of the render passes.

According to one embodiment, the second processor 340 may divide the obtained render stage information for each of the frames using a usage pattern of frame buffers and extract the first render stage information from a result of the division.

According to one embodiment, the extracted first render stage information may include an operation time of each of the frame buffers.

According to one embodiment, the second processor 340 may sort the extracted first render stage information by the operation time of each of the frame buffers.

According to one embodiment, the second processor 340 may obtain render stage information of subsequent frames of the first frame through the executed application in response to detecting a user input to an update button on the UI screen, extract second render stage information of a second frame from the render stage information of the subsequent frames, process the extracted second render stage information, and update the processed first render stage information to the processed second render stage information on the UI screen.

According to one embodiment, the obtained render stage information may include render stage information corresponding to the executed application and render stage information corresponding to one or more of other applications (e.g., a first application and/or a third application). The second processor may identify a target application (e.g., a first application) among the executed application and the one or more of the executed other applications and extract render stage information corresponding to the identified target application from the obtained render stage information.

According to one embodiment, an electronic device (e.g., the electronic device 101 of FIG. 1 and the electronic device 300 of FIG. 3) may include a memory 310 that stores a first application and a second application, a first processor 320 that generates frames by performing render operation stages based on graphics data of the first application, a display 330, and a second processor 340 electrically connected to the memory 310, the first processor 320, and the display 330.

According to one embodiment, the second processor 340 may execute the second application in response to the first application being executed, obtain render stage information (e.g., the render stage information 450 of FIG. 4 and the render stage information 640 of FIG. 6) of the frames through the executed second application, extract first render stage information of a first frame among the frames from the obtained render stage information, process the extracted first render stage information, and display a UI screen including the processed first render stage information on the display 330.

According to one embodiment, the second processor 340 may divide the obtained render stage information for each of the frames based on a queue submission time of a first graphics rendering library and extract the first render stage information from a result of the division.

According to one embodiment, the extracted first render stage information may include an operation time of each of render passes of the first frame.

According to one embodiment, the second processor 340 may sort the extracted first render stage information by the operation time of each of the render passes.

According to one embodiment, the second processor 340 may control the display 330 to display a bar graph corresponding to a proportion of an operation time used by each of the render passes to perform an individual render operation stage to the operation time of each of the render passes.

According to one embodiment, the second processor 340 may divide the obtained render stage information for each of the frames using a usage pattern of frame buffers and extract the first render stage information from a result of the division.

According to one embodiment, the extracted first render stage information may include an operation time of each of the frame buffers.

According to one embodiment, the second processor 340 may sort the extracted first render stage information by the operation time of each of the frame buffers.

According to one embodiment, the second processor 340 may obtain render stage information of subsequent frames of the first frame through the executed application in response to detecting a user input to an update button on the UI screen, extract second render stage information of a second frame from the render stage information of the subsequent frames, process the extracted second render stage information, and update the processed first render stage information to the processed second render stage information on the UI screen.

According to one embodiment, the obtained render stage information may include render stage information corresponding to the executed first application, render stage information corresponding to the executed second application, and render stage information corresponding to an executed third application. The second processor may extract the render stage information corresponding to the first application from the obtained render stage information.

According to one embodiment, an operating method of an electronic device (e.g., the electronic device 101 of FIG. 1 and the electronic device 300 of FIG. 3) may include executing an application for obtaining information on a first processor 320 that performs graphics processing, obtaining render stage information of frames by the performed graphics processing through the executed application, extracting first render stage information of a first frame among the frames from the obtained render stage information, processing the extracted first render stage information, and displaying a UI screen including the processed first render stage on a display 330.

According to one embodiment, the extracting of the first render stage information may include dividing the obtained render stage information for each of the frames based on a queue submission time of a first graphics rendering library and extracting the first render stage information from a result of the division.

According to one embodiment, the extracting of the first render stage information may include dividing the obtained render stage information for each of the frames using a usage pattern of frame buffers and extracting the first render stage information from a result of the division.

According to one embodiment, the operating method of the electronic device may further include obtaining render stage information of subsequent frames of the first frame through the executed application in response to detecting a user input to an update button on the UI screen, extracting second render stage information of a second frame from the render stage information of the subsequent frames, processing the extracted second render stage information, and updating the processed first render stage information to the processed second render stage information on the UI screen.

According to one embodiment, the extracted first render stage information comprises an operation time of each of render passes of the first frame, and the operating method of the electronic device may further include sorting the extracted first render stage information based on the operation time of each of the render passes.

According to one embodiment, the extracted first render stage information comprises an operation time of each of the frame buffers, and the operating method of the electronic device may further include sorting the extracted first render stage information based on the operation time of each of the frame buffers.

According to one embodiment, the obtained render stage information comprises render stage information corresponding to the executed application and render stage information corresponding to one or more of other executed applications, and the operating method of the electronic device may further include identifying a target application among the executed application and the one or more of the other executed applications; and extracting render stage information corresponding to the identified target application from the obtained render stage information.

While embodiments have been described with reference to the figures, it will be understood by those of ordinary skill in the art that various changes in form and details may be made therein without departing from the spirit and scope as defined by the following claims and their equivalents.

What is claimed is:

1. An electronic device, comprising:
memory storing instructions; and
at least one processor comprising processing circuitry,
wherein the instructions, when executed by the at least one processor, cause the electronic device to:
execute a first application;
generate frames based on graphics data of the executed first application;
execute a second application;
obtain render stage information corresponding to the frames through the executed second application;
extract first render stage information corresponding to a first frame, among the frames, from the obtained render stage information, the first frame being a frame preceding a most recent frame, wherein the extracted first render stage information includes an operation time of each of frame buffers used to generate the first frame and the operation time of each of the frame buffers indicates a time at which one or more render stages are performed using each of the frame buffers;
process the extracted first render stage information; and
display, on an execution screen of the executed first application, a user interface (UI) screen comprising the processed first render stage information, and
wherein the displaying comprises displaying the operation time of each of the frame buffers and a type of one or more render stages performed using each of the frame buffers.

2. The electronic device of claim 1, wherein the instructions, when executed by the at least one processor, cause the electronic device to:
divide the obtained render stage information for each of the frames based on a queue submission time of a first graphics rendering library; and
extract the first render stage information based on the dividing of the obtained render stage information.

3. The electronic device of claim 1, wherein the instructions, when executed by the at least one processor, cause the electronic device to sort the extracted first render stage information based on the operation time of each of the render passes of the first frame.

4. The electronic device of claim 3, wherein the instructions, when executed by the at least one processor, cause the electronic device to display a bar graph corresponding to a proportion of the operation time of each of the frame buffers.

5. The electronic device of claim 1, wherein the instructions, when executed by the at least one processor, cause the electronic device to:
divide the obtained render stage information for each of the frames based on a usage pattern of the frame buffers; and
extract the first render stage information based on the dividing of the obtained render stage information.

6. The electronic device of claim 5,
wherein the instructions, when executed by the at least one processor, cause the electronic device to sort the extracted first render stage information based on the operation time of each of the frame buffers.

7. The electronic device of claim 1, wherein the instructions, when executed by the at least one processor, cause the electronic device to:
obtain render stage information of subsequent frames of the first frame based on detecting a user input on an update button on the UI screen;
extract second render stage information of a second frame from the render stage information of the subsequent frames;
process the extracted second render stage information; and
change the processed first render stage information to the processed second render stage information on the UI screen.

8. The electronic device of claim 1, wherein the obtained render stage information comprises render stage information corresponding to the executed first application, render stage information corresponding to the executed second application, and render stage information corresponding to one or more of other executed applications, and
wherein the instructions, when executed by the at least one processor, cause the electronic device to extract render stage information corresponding to the executed first application from the obtained render stage information.

9. An electronic device, comprising:
memory storing instructions; and
at least one processor comprising processing circuitry,
wherein the instructions, when executed by the at least one processor, cause the electronic device to:
generate frames based on graphics data of a first application;
execute a second application based on the first application being executed;
obtain render stage information corresponding to the frames based on the executed second application;
extract first render stage information of a first frame, among the frames, from the obtained render stage information, the first frame being a frame preceding a most recent frame, wherein the extracted first render stage information includes an operation time of each of frame buffers used to generate the first frame and the operation time of each of the frame buffers indicates a time at which one or more render stages are performed using each of the frame buffers;
process the extracted first render stage information; and
display, on an execution screen of the executed first application, a user interface (UI) screen comprising the processed first render stage information, and
wherein the displaying comprises displaying the operation time of each of the frame buffers and a type of one or more render stages performed using each of the frame buffers.

10. The electronic device of claim 9, wherein the instructions, when executed by the at least one processor, cause the electronic device to:
divide the obtained render stage information for each of the frames based on a queue submission time of a first graphics rendering library; and
extract the first render stage information based on the dividing of the obtained render stage information.

11. The electronic device of claim 9, wherein the instructions, when executed by the at least one processor, cause the electronic device to sort the extracted first render stage information based on the operation time of each of the render passes of the first frame.

12. The electronic device of claim 11, wherein the instructions, when executed by the at least one processor, cause the electronic device to display a bar graph corresponding to a proportion of the operation time of each of the frame buffers.

13. The electronic device of claim 9, wherein the instructions, when executed by the at least one processor, cause the electronic device to:
divide the obtained render stage information for each of the frames based on a usage pattern of frame buffers; and
extract the first render stage information based on the division of the obtained render stage information.

14. The electronic device of claim 13,
wherein the instructions, when executed by the at least one processor, cause the electronic device to sort the extracted first render stage information based on the operation time of each of the frame buffers.

15. The electronic device of claim 9, wherein the instructions, when executed by the at least one processor, cause the electronic device to:
obtain render stage information of subsequent frames of the first frame based on detecting a user input on an update button on the UI screen;
extract second render stage information of a second frame from the render stage information of the subsequent frames;
process the extracted second render stage information; and
change the processed first render stage information to the processed second render stage information on the UI screen.

16. The electronic device of claim 9, wherein the obtained render stage information comprises render stage information corresponding to the executed first application, render stage information corresponding to the executed second application, and render stage information corresponding to an executed third application, and
wherein the instructions, when executed by the at least one processor, cause the electronic device to extract render stage information corresponding to the first application from the obtained render stage information.

17. An operating method of an electronic device, the operating method comprising:
executing a first application;
generating frames based on graphics data of the executed first application;
executing a second application;
obtaining render stage information corresponding to the frames through the executed second application;
extracting first render stage information of a first frame, among the frames, from the obtained render stage information, the first frame being a frame preceding a most recent frame, wherein the extracted first render stage information includes an operation time of each of frame buffers used to generate and the operation time of each of the frame buffers indicates a time at which one or more render stages are performed using each of the frame buffers;
processing the extracted first render stage information; and
displaying, on an execution screen of the executed first application, a user interface (UI) screen comprising the processed first render stage information on a display,
wherein the displaying comprises displaying the operation time of each of the frame buffers and a type of one or more render stages performed using each of the frame buffers.

18. The operating method of claim 17, wherein the extracting of the first render stage information comprises:
dividing the obtained render stage information for each of the frames based on a queue submission time of a first graphics rendering library; and
extracting the first render stage information based on the dividing of the obtained render stage information.

19. The operating method of claim 17, wherein the extracting of the first render stage information comprises:
dividing the obtained render stage information for each of the frames based on a usage pattern of frame buffers; and
extracting the first render stage information from based on the dividing of the obtained render stage information.

20. The operating method of claim 17, further comprising:
obtaining render stage information of subsequent frames of the first frame based on the executed second application, the obtaining the render stage information being based on detecting a user input on an update button on the UI screen;
extracting second render stage information of a second frame from the render stage information of subsequent frames;
processing the extracted second render stage information; and
changing the processed first render stage information to the processed second render stage information on the UI screen.

* * * * *